(12) United States Patent
Jüngling et al.

(10) Patent No.: US 6,745,963 B2
(45) Date of Patent: Jun. 8, 2004

(54) PROCESS FOR RECYCLING SIDE DAMS FOR THE CONTINUOUS CASTING OF THIN STEEL STRIP

(75) Inventors: Thomas Jüngling, Kempten (DE); Ulrich Bencker, Sulzberg (DE); Herbert Kiechle, Kempten (DE); Siegfried Lerf, Sulzberg (DE); Stefan Müller, Wiggensbach (DE)

(73) Assignee: Wacker Chemie GmbH, Munich (DE)

( * ) Notice: Subject to any disclaimer, the term of this patent is extended or adjusted under 35 U.S.C. 154(b) by 239 days.

(21) Appl. No.: 10/021,518

(22) Filed: Oct. 30, 2001

(65) Prior Publication Data

US 2002/0079390 A1 Jun. 27, 2002

(30) Foreign Application Priority Data

Nov. 9, 2000 (DE) .......................... 100 55 442

(51) Int. Cl.$^7$ ............................... B02C 19/12
(52) U.S. Cl. .................. 241/29; 241/30; 241/DIG. 14
(58) Field of Search .............. 241/29, 30, 25, 241/DIG. 14

(56) References Cited

U.S. PATENT DOCUMENTS 4,885,264 A    12/1989    Sindlhauser et al.

FOREIGN PATENT DOCUMENTS

| DE | 38 39 730   |   | 7/1989  |
| DE | 3824849 A1  | * | 1/1990  |
| DE | 100 15 849  |   | 10/2001 |
| EP | 0195 417    |   | 9/1986  |
| EP | 447940      |   | 9/1991  |
| EP | 543 398     |   | 5/1993  |

OTHER PUBLICATIONS

English Derwent Abstract Corresp. to DE 100 15 849 AN 2001–617 456 [27].
English Derwent Abstract AN 1990–030679 [05] Corresp. to DE 38 24849.
English Derwent Abstract AN [1989–180529 [25]] Corresp. to DE 38 39 730 A1.
English Derwent Abstract Corresp. to EP 543 398.
English Derwent Abstract AN [1986–253 408 [39]] Corresp. to EP 0195417.

* cited by examiner

Primary Examiner—Mark Rosenbaum
(74) Attorney, Agent, or Firm—Collard & Roe, P.C.

(57) ABSTRACT

Process is for environmentally friendly, low-waste reprocessing of side dams for the continuous casting of thin steel strip having a mechanically or chemically worn surface. The mechanically or chemically worn surface of the side dams is cleaned by methods known per se and the side dams are subsequently converted into a BN-containing powder by crushing and milling.

4 Claims, No Drawings

PROCESS FOR RECYCLING SIDE DAMS FOR THE CONTINUOUS CASTING OF THIN STEEL STRIP

BACKGROUND OF THE INVENTION

1. Field of the Invention

The present invention relates to a process for recycling side dams for the continuous casting of thin steel strip.

2. The Prior Art

Hexagonal boron nitride (BN) is customarily densified by hot pressing pulverulent BN to give bodies having a high sintered density. Side dams for the continuous casting of thin steel strip are made from these sintered bodies by sawing, turning or milling. Apart from pure BN, various mixed ceramics comprising BN and oxides, comprising BN and a mixture of oxides and carbides or comprising BN and sialons (silicas, aluminas, oxides, nitrides) are also produced by hot pressing. Such materials are described, for example, in EP 0 195 417, DE 38 24 849 A1 and U.S. Pat. No. 4,885,264. Customary compositions of such mixed ceramics are a) for BN-oxide-carbide mixed ceramics:
   30–85% by weight of BN
   10–50% by weight of $ZrO_2$, MgO
   5–20% by weight of SiC, ZrC, TiC;

b) for BN-oxide mixed ceramics:
   60–80% by weight of BN
   20–40% by weight of $ZrO_2$, MgO.

DE-A-10015849 describes compositions by means of which moisture absorption after sintering can be avoided by reaction of the $B_2O_3$ during the course of sintering. Such compositions are:

c) for BN-oxide-carbide mixed ceramic:
   21–83.8% by weight of BN
   10–50% by weight of $ZrO_2$, MgO
   5–20% by weight of SiC, ZrC, TiC
   1.2–9% by weight of an additive selected from the group consisting of oxides, carbides and nitrides of the elements Si, Al, Ti and reaction products of the specified additives with $B_2O_3$, d) for BN-oxide mixed ceramic:
   51–78.8% by weight of BN
   20–40% by weight of $ZrO_2$, MgO
   1.2–9% by weight of an additive selected from the group consisting of oxides, carbides and nitrides of the elements Si, Al, Ti and reaction products of the specified additives with $B_2O_3$.

All of the above prior art documents and each of the above compositions are herewith incorporated by reference.

After use, the side dams for the continuous casting of thin steel strip typically display traces of mechanical wear and chemical wear at the points which have been in contact with the metallic melt. The life of the components is determined either by the mechanical and/or chemical wear or by plant or process parameters such as batch size of the melt to be cast or the casting conditions. At the end of the life of the component, it is typical for >90% of its volume not to have been eroded away either mechanically or chemically. Nevertheless, the entire components have hitherto been discarded and replaced by new components.

SUMMARY OF THE INVENTION

It is an object of the present invention to provide a process which allows environmentally friendly, low-waste reprocessing of side dams for the continuous casting of thin steel strip, hereinafter referred to as side dams, having a mechanically or chemically worn surface.

The above object is achieved according to the present invention by a process in which the mechanically or chemically worn surface of the side dams is cleaned by methods known per se and the side dams are subsequently converted into a BN-containing powder by crushing and milling.

The side dam is preferably cleaned by mechanical grinding of the wear surface of the side dam which has been in contact with a metal melt. This grinding removes the reaction layer which is formed during metallurgical use of the side dam. After the reaction layer has been ground away, the side dam has the same composition as an unused side dam.

A side dam which has been cleaned in this way is coarsely broken up by means of a jaw crusher and subsequently milled to a powder by means of a conventional milling apparatus, e.g. a ball mill, vibratory mill or impact plate mill.

The powder preferably has a particle size similar to a corresponding new powder which is used for the production of a side dam. This is generally a mean particle size of about 10–15 µm.

The composition of the powder obtained in this way corresponds approximately to that of the powder mixture originally used. It is possible for merely a small increase in the oxygen content to occur during reprocessing according to the invention. However this can be greatly eliminated by appropriate reprocessing methods, e.g. milling under a protective gas atmosphere.

The milling in the process of the invention is therefore preferably carried out under a protective gas, preferably in a nitrogen gas atmosphere or in an argon gas atmosphere.

The invention therefore also provides BN powder mixtures which have been produced by the process of the invention. The recycled BN powder obtained in this way can be used as raw material for the production of new side dams. The recycled BN powder can be used in its pure form. Preferably the recycled BN powder is used with the addition of new fresh raw BN powder materials to form a BN powder mixture comprising recycled BN powder and the new fresh raw BN powder.

The term "new fresh raw BN powder" means BN powder which has never before been previously used to make a side dam.

The proportion of recycled BN powder in the BN powder mixture is preferably in the range from 10% to 60% by weight, particularly preferably from 20% to 50% by weight, and very particularly preferably from 25% to 35% by weight. The percent by weight of the recycled BN powder is based upon the total weight of the BN powder mixture. The balance of the powder mixture up to 100% by weight is fresh new BN powder.

Astonishingly, it has been found that the side dams produced from recycled powder only or from using the recycled powder mixture have better properties than side dams which have been produced exclusively from fresh new powder raw materials.

Especially side dams containing 10–60% by weight of recycled BN powders, preferably 20–50% by weight of recycled BN powders, and particularly preferably 25–35% by weight of recycled powders, unexpectedly display improved properties such as higher density, greater flexural strength and greater hardness. The percent by weight of the recycled BN powder is based upon the total weight of the BN powder mixture. The balance of the BN powder mixture up to 100% by weight is new fresh raw BN powder.

The present invention therefore also relates to side dams for metallurgical applications which have been produced using a recycled powder according to the present invention.

DETAILED DESCRIPTION OF PREFERRED EMBODIMENTS

Other objects and features of the present invention will become apparent from the following detailed description considered in connection with the accompanying examples which disclose several embodiments of the present invention. It should be understood, however, that the examples are designed for the purpose of illustration only and not as a definition of the limits of the invention.

EXAMPLE 1

Side dams which had become contaminated by contact with steel melts during use served as starting material for the production of a recycled powder. The contaminated surfaces were ground so that no traces of contamination, adhering material or reaction zones remained. A diamond grinding disk customary in the machining of ceramics was used as grinding disk. The parts obtained were subsequently coarsely broken up by means of jaw crushers. The coarsely broken up material was milled for 1 hour in a vibratory mill to give a powder having a mean particle size of 10–15 µm.

EXAMPLE 2

Production and comparison of a BN ceramic according to the invention comprising recycled powder (IB) and a comparative BN ceramic (CB) according to the prior art:
Homogeneous powder mixtures having the following compositions were prepared:

IB: 100% by weight of new BN powder comprising 34.3% of BN, 28% of $ZrO_2$, 5.6% of SiC, 2.1% of $B_2O_3$ (100% of 70%) and 30% by weight of recycled BN powder having the composition 49% of BN, 40% of $ZrO_2$, 8% of SiC, 3% of $B_2O_3$ (30% of 100%). Thus IB comprises 70% new BN powder and 30% recycled BN powder based upon the total weight of the IB powder mixture.

CB: 100% by weight 49% of BN, 40% of $ZrO_2$, 8% of SiC, 3% of $B_2O_3$.

The homogeneous powder mixtures were densified by axial two-sided hot pressing in graphite dies at temperatures of >1650° C. and a pressure of >25 MPa to produce sintered bodies having a density of >94% of the theoretical density. Specimens for determining the following physical and mechanical properties were sawn from the sintered bodies by means of band saws:

|  | IB | CB |
|---|---|---|
| Density [g/cm$^3$] | 3.02 | 2.92 |
| Flexural strength | 148 | 120 |
| E modulus [GPa] | 80 | 80 |
| Brinell hardness | 90 | 65 |
| Thermal conductivity | RT 15.8 | RT 16.9 |
|  | 400° C. 9.9 | 400° C. 10.0 |

Under the conditions selected, the material according to the invention has better mechanical properties than the material according to the prior art.

Accordingly, while a few embodiments of the present invention have been shown and described, it is to be understood that many changes and modifications may be made thereunto without departing from the spirit and scope of the invention as defined in the appended claims.

What is claimed is:

1. A process for environmentally friendly, low-waste reprocessing of side dams for the continuous casting of thin steel strip having a mechanically or chemically worn surface, comprising cleaning a mechanically or chemically worn surface of side dams; and subsequently converting cleaned side dams into a BN-containing powder by crushing and milling.

2. The process as claimed in claim 1, wherein a wear surface of the side dam which has been in contact with a metal melt is ground mechanically.

3. The process as claimed in claim 1, wherein the cleaned side dams are coarsely broken up by means of a jaw crusher and subsequently milling to a powder by means of a milling apparatus.

4. The process as claimed in claim 3, wherein the milling is carried out under a protective gas atmosphere.

* * * * *